United States Patent [19]

Scruggs

[11] Patent Number: 4,710,235

[45] Date of Patent: Dec. 1, 1987

[54] PROCESS FOR PREPARATION OF LIQUID PHASE BONDED AMORPHOUS MATERIALS

[75] Inventor: David M. Scruggs, San Juan Cap., Calif.

[73] Assignee: Dresser Industries, Inc., Dallas, Tex.

[21] Appl. No.: 586,199

[22] Filed: Mar. 5, 1984

[51] Int. Cl.$^4$ ............................................. C23C 10/00
[52] U.S. Cl. ........................................ 148/4; 148/127; 148/403; 228/190; 228/194; 228/249; 419/35
[58] Field of Search .................. 156/283, 89; 228/190, 228/193, 194, 248, 249; 148/31.55, 403, 127, 4; 75/123 B; 419/8, 35, 61, 68, 64, 6; 264/6, 7, 11, 82; 427/190, 192; 428/609, 611, 700, 615; 29/609

[56] References Cited

U.S. PATENT DOCUMENTS

| | | | |
|---|---|---|---|
| 3,415,697 | 12/1968 | Bredzs et al. | 228/245 X |
| 4,115,682 | 9/1978 | Kavesh et al. | 75/123 B X |
| 4,197,146 | 4/1980 | Frischmann | 148/31.55 |
| 4,282,034 | 8/1981 | Smith et al. | 264/6 X |
| 4,298,382 | 11/1981 | Stempin et al. | 228/193 X |
| 4,325,895 | 4/1982 | Morris | 148/31.55 X |
| 4,385,944 | 5/1983 | Hasegawa | 148/31.55 X |
| 4,413,406 | 11/1983 | Bennett et al. | 228/249 X |
| 4,423,120 | 12/1983 | Paulus et al. | 228/116 X |
| 4,490,329 | 12/1984 | Hare et al. | 148/403 X |
| 4,564,396 | 1/1986 | Johnson et al. | 148/403 X |
| 4,621,031 | 11/1986 | Scruggs | 428/627 |

Primary Examiner—Donald E. Czaja
Assistant Examiner—Ramon R. Hoch
Attorney, Agent, or Firm—Gregory O. Garmong; William R. Peoples

[57] ABSTRACT

A process for bonding together two or more pieces of material, at least one of which is an amorphous material, wherein an intermediate interlayer is placed between the two pieces and the assembly is hot pressed at a temperature above the melting point of the interlayer but below the crystallization temperature of the amorphous piece. The composition of the interlayer is chosen so that the elements diffusing into the pieces being bonded are compatible with retention of the amorphous structure. When the bonding operation is carried to completion, no evidence of the interlayer as a separate phase remains. Alternatively, the bonding operation may be halted before completion and the interlayer will remain as a separate, observable phase. For bonding hard metal amorphous materials, alloys of aluminum with silver, gold, silicon and germanium, and alloys of gold with silicon, with the addition of fluxing elements such as phosphorus and boron, have been found to provide particularly satisfactory results.

11 Claims, 5 Drawing Figures

PROCESS FOR PREPARATION OF LIQUID PHASE BONDED AMORPHOUS MATERIALS

BACKGROUND OF THE INVENTION

This invention relates generally to the joining of materials, and more particularly, to a liquid phase bonding process for joining two or more pieces, at least one of which is an amorphous material.

Metals ordinarily solidify from the molten state as crystals having a periodically repeating crystalline structure. When properly processed, however, many normally crystalline materials may be prepared in an amorphous state exhibiting little or no structural periodicity. In some instances, such amorphous materials are observed to have extremely high strengths with sufficient fracture toughness to render them attractive engineering materials. Further, the amorphous materials have no grains or grain boundaries, and consequently are more resistant to attack by corrosion than are crystalline materials of the same composition. Amorphous materials are therefore important candidates for use as engineering structural materials.

The amorphous materials known to date are typically prepared by rapid solidification from the liquid state at cooling rates of about $10^5$° C. per second, or greater. To achieve the necessary high cooling rates, the amorphous materials are solidified as thin sheets or strips having a thickness of less than about 0.07 mm by depositing a liquid alloy on a cool substrate as a thin layer so that heat is extracted very rapidly and high cooling rates are achieved. Alternatively, high cooling rates may be achieved by solidifying the amorphous material as a powder directly from the liquid state. Other procedures for preparing amorphous materials are known or under development, but generally, the preparation techniques limit the form of the as-prepared amorphous material to thin strips or powders.

Although thin strips or powders of materials have some limited engineering uses, most applications require that these basic forms be assembled into larger pieces that are more readily utilized. For example, a thin strip may be used as an overlay to protect a substrate, but this use requires that the thin strip be attached to the substrate in some fashion. In another example, powders are typically sintered into parts for subsequent use.

The ability to join or bond amorphous materials by conventional metallurgical techniques is limited by the crystallization of the amorphous material. Amorphous materials may be converted to the crystalline state by introducing sufficient energy to induce a transformation to a periodic structure, as by heating the amorphous material above a "crystallization temperature" which may be readily determined for each material by conventional techniques. Many of the beneficial properties of the amorphous state are lost upon crystallization, and it is therefore necessary that a bonding or joining technique avoid inducing crystallization. Thus, there exists a need for a bonding or joining technique for fabricating the as-prepared amorphous materials into engineering structures.

Certain conventional bonding or joining techniques may be utilized in specific applications, but in others suffer from serious drawbacks. Conventional fasteners such as bolts may be used to join amorphous pieces such as strips, but these fasteners introduce undesirable stress concentrations, may be highly susceptible to corrosive attack in media wherein the corrosion-resistant amorphous material may otherwise be used, and cannot be used in some applications due to physical limitations. Moreover, fasteners do not produce a continuous bond across the joined surfaces of the pieces.

Conventional adhesives such as glues or epoxies may be used to join amorphous pieces with a continuous bond, but the nonmetallic bonding agent rapidly loses strength at increasing temperatures and also is susceptible to degradation by wear. Many of the projected applications of amorphous materials require a fully metallic structure, including the bonding means.

Brazing and soldering techniques for joining metals produce a fully metallic final structure. However, with both of these techniques the final bonded structure includes an intermediate layer of crystalline material. If the bonded part is to be used in a corrosive environment, this intermediate layer will most likely be preferentially attacked by the medium, leaving an incipient crack at the interface between the bonded pieces. Further, the alloying ingredients in the brazing or soldering material may diffuse into the parts to reduce the crystallization temperature of the amorphous material by an alloying effect. Such an alloying effect leads to an undesirable reduction in the potential operating temperature of the final bonded part.

Powdered amorphous materials cannot be joined using conventional sintering techniques such as hot pressing, as the required high temperature induces crystallization of the powder particles.

While a number of techniques for bonding and joining amorphous materials have been proposed or may be visualized from conventional joining techniques, no technique has been proposed for joining amorphous materials to form a continuously bonded, fully metallic, amorphous structure. Accordingly, there exists a need for such an approach. The present invention fulfills this need, and further provides related advantages.

SUMMARY OF THE INVENTION

The present invention resides in a process for bonding together two or more pieces of material, at least one of which is amorphous, and materials and parts made by such a process, wherein bonding is accomplished through the use of a diffusionally compatible interlayer placed between the pieces to be bonded. The processing conditions and interlayer material composition are chosen so that the amorphous nature of the pieces being bonded is preserved. The approach may be applied to the bonding of two amorphous piece to a non-amorphous piece. As applied to the bonding of two amorphous pieces to each other, when the process is carried to completion, the final bonded piece is fully amorphous and without any non-amorphous portion in the bond line. The bonding process of the invention may be readily applied to both large pieces and small pieces such as powders.

In accordance with the invention, an interlayer is placed between two pieces to be bonded together to form an assembly, at least one of the pieces being an amorphous material, with the composition of the interlayer chosen to be diffusionally compatible with the retention of the amorphous structure. The assembly is then hot pressed at a temperature which must be above the solidus of the interlayer material but below the lowest of the crystallization temperatures of the amorphous pieces being bonded. Bonding proceeds by the interdiffusion of the molten interlayer phase and the pieces being bonded, and may continue as solid state interdiffusion after solidification of the interlayer phase. The interdiffusion process may be allowed to continue to completion, so that the material originally comprising the interlayer phase is completely diffused into the pieces being bonded, thence disappearing and leaving only the original pieces with a diffusionally altered layer adjacent the original bond line.

The composition of the interlayer phase must have a solidus temperature less than the crystallization temperature of the amorphous piece or pieces being bonded. The hot pressing operation is accomplished at a temperature greater than the solidus temperature so that the interlayer phase is at least partly molten during the initial stages of the bonding process. Additionally, the composition of the interlayer phase is chosen so that the interdiffusion of the amorphous and interlayer phases will not so alter the composition of the amorphous phase as to reduce the local crystallization temperature of the interdiffused layer below the hot pressing temperature, thereby avoiding the possibility of crystallization of a portion of the amorphous phase during the bonding treatment.

For example, to bond typical hard metal amorphous materials such as tungsten-ruthenium-boron compositions, it has been found that the interlayer phase desirably comprises an aluminum-silicon, aluminum-germanium, aluminum-silver, aluminum-gold-silver or gold-silicon composition, with additions as noted below. These alloys typically melt at or below about 600° C., well below the crystallization temperature of the hard metal amorphous material. Diffusion of the components of the interlayer phase into the hard metal amorphous materials reduces their crystallization temperature only a few percent, so that, even after interdiffusion, the piece being bonded remains fully amorphous.

To eliminate or avoid the effects of oxidation, alloying elements may be added to the interlayer material to flux the bond. Specifically, phosphorous and boron additions have been found useful in the interlayer compositions for hard metal amorphous materials discussed above. These additions are present only in minor amounts, and do not significantly reduce the crystallization temperature of the amorphous material after interdiffusion. Hot pressing in a vacuum or in a reducing atmosphere such as hydrogen-nitrogen gas also reduces interference with the bonding process by oxidation, and specific reducing agents such as zirconium hydride may also be added at the bond line to accomplish this result.

The bonding of amorphous pieces by the present invention extends to a wide variety of forms of the pieces being bonded, as well as the interlayer material. One or both of the pieces being bonded may be amorphous, so that the process is suitable for bonding one amorphous piece to another, or bonding an amorphous piece to a non-amorphous piece. The pieces being bonded may be of the same or different compositions. The pieces being bonded can be relatively large in size, as with the bonding of a strip of amorphous material to a substrate to form a protective overlay or the bonding of two amorphous strips together. The pieces being bonded may also be relatively small in size, as the process is applicable to the bonding and sintering of powders.

The interlayer phase may be provided in a variety of forms, with the selection made for convenience or to achieve a specific purpose such as maximizing the area of bonding and minimizing voids at the interface after bonding. For example, the interlayer phase may be provided as a sheet or strip placed between the parts to be bonded, as a powder between the pieces being bonded, or as a coating on one or both of the pieces being bonded. If the pieces being bonded are themselves amorphous powders, it may be convenient to provide the interlayer phase either as a coating on the powders or as a separate powder intermixed with the amorphous powder particles.

In the process of the invention, the pieces to be bonded and the interposed interlayer phase, herein termed an "assembly", is hot pressed at a temperature greater than the melting point or solidus of the interlayer phase, but less than the crystallization temperature of the amorphous piece. If two amorphous pieces of differing compositions are being bonded, the hot pressing must occur at a temperature below the lesser of the crystallization temperatures of the two pieces. During the hot pressing, interdiffusion of the liquid interlayer phase and the solid pieces on either side of the bond line occurs. In one preferred approach, the interdiffusion process results in isothermal solidification adjacent the interface between the solid pieces and the liquid interlayer phase with the result that the thickness of the liquid interlayer phase continually decreases with increasing interdiffusion. Ultimately, if the process is carried to completion, the interlayer phase completely disappears. Upon cooling, no crystalline interlayer phase is evident, and the entire bonded piece is substantially amorphous (if the starting pieces were both amorphous). Further interdiffusion and strengthening of the bond may be accomplished by solid state diffusion.

It will be appreciated from the foregoing that the present invention represents a significant advance in the processing technology of amorphous materials. With this bonding technique, amorphous pieces may be bonded to other amorphous pieces or non-amorphous pieces with a continuous metallic bond. The amorphous character of the pieces is retained, and the non-amorphous interlayer material is removed by carrying the bonding process to completion, thereby removing any non-amorphous phase which might be weaker and more susceptible to corrosive attack. The bonding process permits great flexibility in the choice of the form of the pieces to be bonded and in the form in which the interlayer phase is provided. Other features and advantages of the present invention will become apparent from the following more detailed description of the preferred embodiments, taken in conjunction with the accompanying drawings, which illustrate, by way of example, the principles of the invention.

DETAILED DESCRIPTION OF THE PREFERRED EMBODIMENTS

Figure 1:
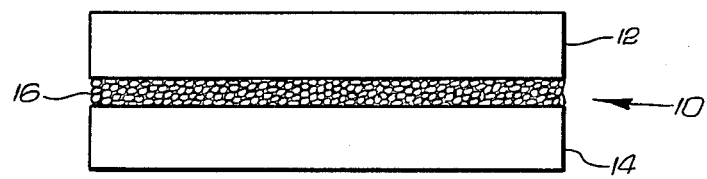
FIG. 1 is a schematic sectional elevational view of a first preferred embodiment of the invention, illustrating an assembly of two pieces to be bonded and a powder interlayer prior to the commencement of bonding.

As is shown in the drawings with reference to two preferred embodiments of the invention, the present invention is concerned with the bonding of two or more pieces of material, at least one of which is amorphous, through the use of an interlayer placed between the pieces to form an assembly, and a subsequent hot pressing of the assembly. FIG. 1 illustrates an assembly 10, having a first piece 12 and a second piece 14 to be joined together. The pieces 12 and 14 may both be amorphous or only one of the pieces may be amorphous. Amorphous pieces to be joined are prepared by conventional techniques such as rapid solidification which are well known in the art and need not be described in detail, as the present invention deals with the bonding of the pieces rather than their preparation.

Figure 2:
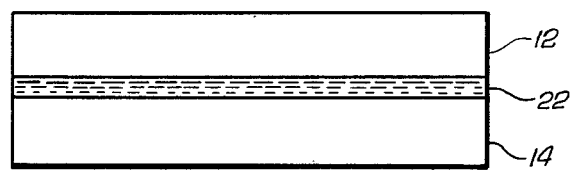
FIG. 2 is a view similar to FIG. 1, except at an intermediate stage of the bonding process.
Figure 3:
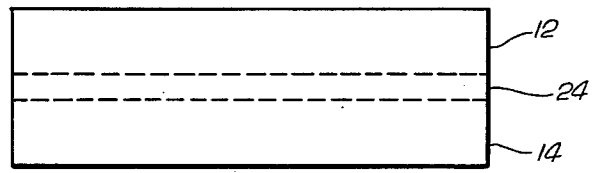
FIG. 3 is a view similar to FIG. 1, except after the bonding process is completed.

In accordance with the present invention, a diffusionally compatible interlayer is placed between the pieces to be bonded, and the assembly is bonded by hot pressing at a temperature above the solidus of the interlayer but below the crystallization temperature of the amorphous piece or pieces to be bonded. In the first preferred embodiment of FIGS. 1-3, the interlayer is provided as a bonding powder layer 16 between the pieces 12 and 14. In a second preferred embodiment of FIG. 4, the interlayer is provided as a coating 18 on a powder particle 20. The principles set out here and below for the selection of the interlayer material and the processing are applicable to these and other embodiments of the invention, except as noted.

The facing surfaces of the pieces to be bonded should be free of physical barriers such as a scale on the surface, and should be cleaned if necessary. It is desirable but not necessary to remove the major portion of oxide layers present on the surface, as excessive amounts of oxides may result in inclusions in the bond line after completion of the bonding process.

The interlayer is provided between the pieces to be bonded in the form of the bonding powder 16 or the coating 18. The interlayer may also be provided in other forms physically compatible with the pieces to be bonded, such as sheets, foils, strips, platings, overlays, or deposits. The thickness of the interlayer is not critical, and may vary from microns or less in thickness up to several thousands of an inch. The thinner the interlayer, the less time required to reach "completion" of the bonding, as that term is used herein.

Bonding is accomplished by hot pressing the assembly comprising the pieces to be bonded and the interlayer at a temperature whereat the interlayer is at least partly liquid and the amorphous piece or pieces do not undergo crystallization. The bonding temperature must be greater than the solidus temperature of the interlayer, but less than the lowest of the crystallization temperatures of the amorphous pieces being bonded. If only one of the pieces is an amorphous material, or if both pieces are amorphous materials of the same composition, then the upper limit of the hot pressing temperature is the crystallization temperature of that material. Where both pieces are amorphous materials, but of differing compositions, the upper limit of hot pressing temperature is the lower of the crystallization temperatures of the two pieces.

For interlayers not of eutectic composition, the lower limit of the hot pressing temperature is the temperature at which liquid interlayer material first forms upon heating, termed herein the "solidus temperature" and preferably the hot pressing is accomplished above the interlayer liquidus temperature so that the entire interlayer phase is initially molten. Where the interlayer material is of eutectic composition, the lower limit of the hot pressing is the eutectic temperature. For an interlayer material of eutectic composition, the solidus temperature is the eutectic temperature. These principles for establishing the range of temperatures may be readily extended to bonding of more than two pieces.

The hot pressing pressure is not critical and may be varied over a wide range with acceptable results. With increasing pressure, the likelihood of voids remaining in the bond line is reduced, and some of the liquid interlayer tends to extrude out of the bond line. Some extrusion may be beneficial in that impurities at the edges of the pieces such as packing material, are removed from the interface area. Excessive extrusion which eliminates a major portion of the interlayer phase is undesirable, however.

The pressure need only be sufficient to force the pieces together as bonding proceeds, and may be replaced by other such forces. For example, it is believed that the bonding of powders may proceed without any externally applied pressure, as surface tension forces may be sufficient to force the surfaces together. Thus, the term "hot pressing" as used herein is intended to encompass any operation wherein sufficient forces to accomplish the bonding are present. Conveniently, the forces may be applied by unidirectional loading or isostatic pressing.

Upon heating the assembly above the solidus temperature of the interlayer, at least a portion, and preferably all, of the interlayer becomes a liquid layer 22. The material of the solid pieces and the liquid then begin to interdiffuse. Interdiffusion begins immediately, so that the bonding begins immediately. The interdiffusion treatment may be continued to achieve the desired degree of interdiffusion by prolonging the hot pressing operation. This interdiffusion promotes the elimination of any recognizable interface between the phases and the formation of a strong bond between the phases after the bonded pieces are cooled. It is desirable that the diffusion zone forming a transition zone 24 between the pieces 12 and 14 have mechanical and chemical properties comparable to those of the adjacent amorphous pieces. The bonded pieces or powder compact may be held at elevated temperature to promote diffusional homogenization to achieve this end. If diffusional homogenization is greatly extended, the transition zone 24 may completely disappear by diffusion.

The selection of the initial composition of the interlayer phase is constrained by several considerations. The interlayer phase must have a melting point lower than the crystallization temperature of the amorphous piece, and preferably is eutectic or near eutectic in composition. At least some, and preferably all, of the elements of the interlayer phase must interdiffuse with the elements of the solid pieces, at temperatures within the hot pressing range in a reasonable period of time.

The interdiffusion of the solid pieces and the interlayer produces the transition zone 24 whose composition varies from that of the solid pieces on either side of the zone. The composition of the transition zone varies from that of the adjacent solid pieces because of the interdiffusion process. The amount and composition of the interlayer phase must be chosen so as to be "diffusionally compatible" with the pieces being bonded. "Diffusionally compatible" as used herein means that the composition of the transition zone must not vary from that of the amorphous pieces being bonded so greatly that the crystallization temperature of the diffused transition zone 24 is significantly reduced below the hot pressing temperature. Diffusion compatibility of an amorphous and a second material is readily assessed by placing the two in contact at a temperature just below the crystallization temperature of the amorphous material and allowing interdiffusion to occur. If the interdiffused zone remains amorphous, as determined by conventional X-ray or other techniques, then the two materials are diffusionally compatible. Diffusional compatibility is enhanced when the majority of the atoms in the interlayer are chosen from the known glass-forming elements, most of which are found in the middle of the periodic table. Examples of acceptable glass forming elements are aluminum, silicon, boron, carbon, silver, gold, germanium and phosphorus. Alloys of aluminum and other glass forming elements are particularly preferred, as they are readily prepared or commercially available and relatively inexpensive. Diffusional compatibility is also enhanced by decreasing the thickness of the interlayer, as the total amount of material to be incorporated into the pieces being bonded, without inducing crystallization, is reduced.

"Hard metal" amorphous materials are those formed from elements having relatively high melting points, and typically include amorphous materials rich in tungsten, ruthenium, and niobium, usually in combination with glass-forming elements such as boron, silicon, carbon and aluminum, which are found generally in the middle of the periodic table. For bonding hard metal amorphous pieces to other amorphous pieces of the same or different compositions, or to non-amorphous pieces, by the process of the present invention, alloys of aluminum and other glass forming element are preferred.

Interdiffusion of a small amount of such an interlayer composition into an amorphous piece does not produce a transition zone having significantly different mechanical and chemical properties from that of the initial amorphous piece and the crystallization temperature of the transition zone is not reduced by more than a few percent below the crystallization temperature of the undiffused amorphous piece. Thus, after the interdiffusion is complete and the bond between the pieces formed, the transition zone 24 is fully amorphous if both pieces being bonded are amorphous, and is amorphous adjacent the amorphous piece if only one amorphous piece is utilized.

The interdiffusion of the interlayer and the solid pieces continues to "completion" when both pieces being bonded are amorphous, and the last remaining interlayer phase dissapears as a result of interdiffusion. Because of the composition gradient between the pieces and the transition zone, interdiffusion continues during the isothermal pressing treatment in the solid state, and this continued diffusion decreases the concentration gradients in the transition zone.

When bonding of two amorphous pieces is carried to "completion" as defined herein, the final structure is fully metallic, fully amorphous and fully bonded across the entire contact surface between the pieces. Therefore, the entire bonded structure displays the excellent mechanical properties, including hardness and wear resistance, and high chemical corrosion resistance properties found in amorphous materials. In the bonding of an amorphous piece to a non-amorphous piece, on the other hand, there is no need that the transition zone be fully amorphous, because one of the pieces itself is non-amorphous.

Utilizing the basic bonding technique of the invention, large structures may be built up from smaller pieces of amorphous and non-amorphous materials. For example, two pieces may be bonded together, and then this structure bonded to yet another piece whose composition or physical orientation in respect to the first two bonded pieces makes impossible the bonding of all three pieces in a single operation. In this example, the hot pressing temperature of the second bonding step, wherein the third piece is bonded to the first two pieces, is not limited by the first interlayer composition or to the first hot pressing temperature. Instead, the second bonding treatment is limited only by the constraints set forth hereinabove, as applied between the third piece and each solid piece to which it is bonded. Of course, at no time should the assembly be portion thereof, unless crystallization is desired.

The bonding parameters for the joining of subsequent pieces are also governed by these same principles as applied to the solid pieces to be joined during the bonding operation. Alternatively, if a number of solid pieces are joined in a single bonding operation where chemically and physically feasible, again the principles of the invention set forth herein are applied as to each of the separate bonds being formed.

Figure 4:
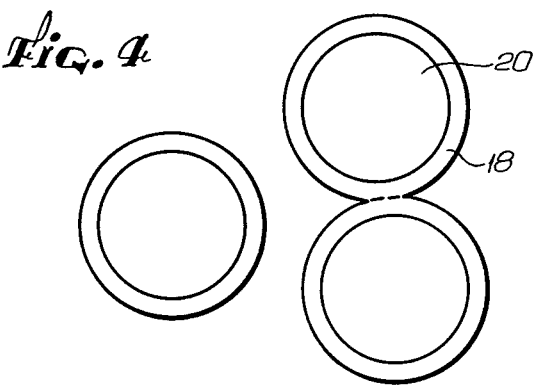
FIG. 4 is an enlarged sectional view of a second preferred embodiment of the invention, wherein amorphous powder particles have an interlayer coated thereon, prior to the initiation of hot pressing.

As described hereinabove and illustrated in FIG. 4, the present invention may be applied to the sintering together of a mixture of amorphous powders, or the sintering together of a mixture of amorphous and non-amorphous powders. In one approach, the interlayer phase 18 may be coated or plated onto the individual powder particles 20. In another approach, small pieces or particles of the interlayer phase may be dispersed within the powders to be bonded, so that the interlayer phase melts and coats the particles at the hot pressing temperature. Particularly when bonding powder particles together, it may be desirable to continue the diffusional homogenization until the composition of the bonded compact is homogeneous.

In a presently preferred approach, a piece of the interlayer material is placed in the center of a mass of amorphous powder, which in turn is sealed into a steel container. The container is heated to a temperature above the solidus of the interlayer but below the crystallization temperature of the powder. Isostatic pressure is externally applied to the container to collapse the container walls inwardly. As the walls collapse, the now-liquid interlayer material extrudes into the spaces between the powder particles. The liquid interlayer then interdiffuses with the powder in the same manner previously described, to bond the powder particles. The interdiffusion may be carried to completion or stopped short of completion.

In some instances of the sintering of powder compacts by the process of the present invention, it is believed that the application of an external pressure will not be required, inasmuch as the surface tension forces within the compact will be sufficient to allow bonding to proceed. For instances wherein all of the powder particles are initially amorphous and the bonding process is carried to "completion", the final bonded powder compact is fully amorphous and well bonded, this result being accomplished without any application of explosive force as required in prior techniques for the production of amorphous compacts.

The bonding process in accordance with the present invention is preferably accomplished in a manner which avoids the formation of oxides during hot pressing, or reduces oxides previously present. Several techniques for accomplishing this purpose may be utilized either singly or in combination to minimize the effect of oxides in the final bonded part. The bonding atmosphere may be controlled to reduce oxides, as by maintaining a reducing atmosphere such as hydrogen or hydrogen-nitrogen. A vacuum may also be utilized to avoid the formation of oxides, but a vacuum does not reduce oxides previously present. In another approach, the interlayer composition may include fluxing elements to remove oxides or other contaminants. The fluxing elements include, for example, small additions of boron or phosphorus. In another approach, a reducing or scavenging agent may be provided as a separate addition at the faces of the pieces being bonded, to eliminate undesirable oxides or other contaminants. An example of such a reducing agent is solid zirconium hydride.

EXAMPLES

The following examples illustrate the application of the invention, but should not be interpreted as limiting the scope of the invention in any respect.

EXAMPLE 1

Two pieces of an amorphous alloy having a composition in weight percent of 65 tungsten, 32.5 cobalt, 2.5 boron were bonded together using an interlayer having a composition in weight percent of 70 silver - 30 aluminum. The silver-aluminum interlayer material was furnished in powder form. One piece of the amorphous alloy was placed into a hot press, and a layer of powder about 0.005 inch thick was spread evenly over the amorphous piece. The second amorphous piece was placed over the powder layer. The assembly was then hot pressed in one atmosphere argon gas at a ram pressure of 7200 psi and a temperature of 620° C. for 15 minutes, followed by a heat treatment in argon at 445° C. for one hour, without applied pressure. Sectioning and microscopic evaluation showed that a bond was formed between the pieces, but the crystalline interlayer was still present, indicating that the bonding had not been carried to completion. The pieces being bonded remained substantially amorphous.

EXAMPLE 2

A sample of the material prepared by the process of Example 1 was sealed into an evacuated quartz capsule and placed into a furnace at 480° C. for 25 hours. After this heat treatment, microscopic evaluation showed that the two pieces remained bonded together, and in addition that the separate crystalline phase was partially eliminated by interdiffusion. Had the process has been carried to completion, the final structure would have been completely metallic, substantially amorphous throughout, and fully bonded.

EXAMPLE 3

Two pieces of an amorphous alloy having a composition in weight percent of 46.6 iron - 48.9 nickel - 4.5 boron were bonded together using an interlayer having a composition in weight percent of 97.15 gold - 2.85 silicon, with an addition of zirconium hydride in an amount of 5 weight percent of the total. The gold-silicon interlayer material was furnished in powder form. One piece of the amorphous alloy was placed into a hot press, and a layer of powder about 0.002 inch thick was spread evenly over the amorphous piece. The second amorphous piece was placed over the powder layer. The assembly was then hot pressed in one atmosphere argon gas at a ram pressure of 5500 psi and a temperature of 565° C. for 20 minutes, followed by a heat treatment in argon at 400° C. for 75 minutes, without applied pressure. Sectioning and microscopic evaluation showed that the pieces were well bonded and that a crystalline interlayer about 0.0015 inch thick remained, indicating that the bonding had not been carried to completion. The pieces bonded remained substantially amorphous.

EXAMPLE 4

A sample of the material prepared by the process of Example 3 was sealed into an evacuated quartz capsule and placed into a furnace at 480° C. for 25 hours. After completion of this heat treatment the pieces were sectioned and evaluated by microscope. The two pieces remain bonded together, and in addition the separate crystalline phase was partially eliminated by interdiffusion. Had the process been carried to completion, the final structure would have been completely metallic, substantially amorphous throughout, and fully bonded.

EXAMPLE 5

Figure 5:
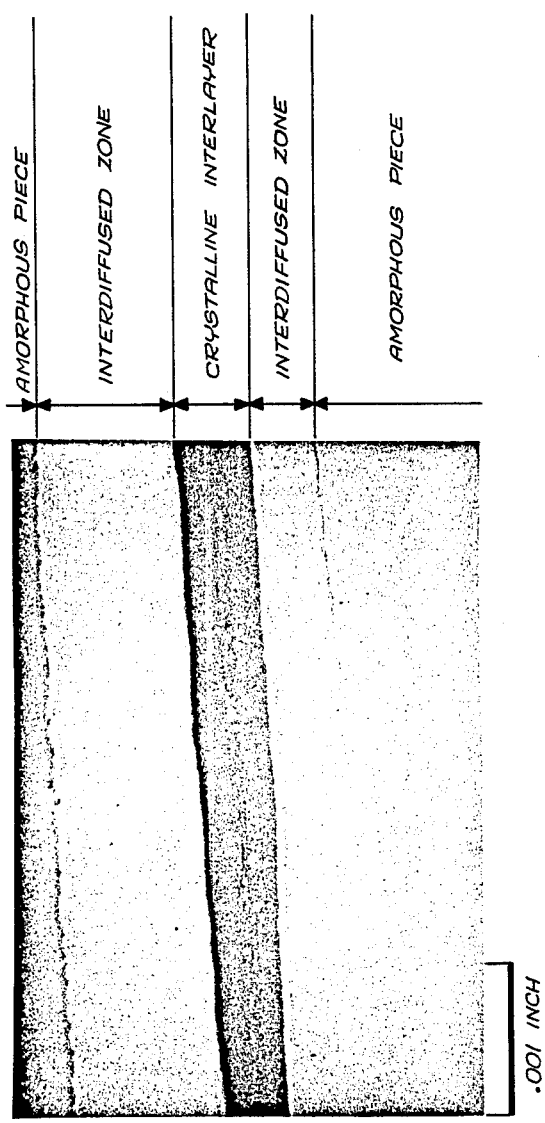
FIG. 5 is a photomicrograph corresponding in view to FIG. 2, of two hard-metal amorphous pieces bonded in the manner described in EXAMPLE 5 herein and at an intermediate stage of bonding.

Two pieces of an amorphous alloy having a composition in weight percent of 46.6 iron - 48.9 nickel - 4.5 boron were bonded together using an interlayer having a composition in weight percent of 87 aluminum -13 silicon, with an addition of zirconium hydride in an amount of 1 weight percent of the total. The aluminum - silicon interlayer material was furnished in powder form. One piece of the amorphous alloy was placed into a hot press and a layer of powder about 0.005 inch thick was spread evenly over the amorphous piece. The second amorphous piece was placed over the powder layer. The assembly was then hot pressed in one atmosphere argon gas at a ram pressure of 15,800 psi and a temperature of 650° C. for 1 hour, followed by a heat treatment in argon at 480° C. for 1 hour, without applied pressure. The bonded piece was then sectioned, and FIG. 5 illustrates the resulting microstructure in cross section. A bond had been formed between the pieces. The crystalline interlayer was still present, indicating that the bonding had not been carried to completion. The pieces bonded remain substantially amorphous.

EXAMPLE 6

A sample of the material prepared by the process of Example 5 was sealed into an evacuated quartz capsule and placed into a furnace at 480° C. for 25 hours. After this treatment, the sample was sectioned and evaluated by microscope. The two pieces remained bonded together, and in addition the separate crystalline phase was partially eliminated by interdiffusion. Had the process has been carried to completion, the final structure would have been completely metallic substantially amorphous throughout, and fully bonded at the interface.

EXAMPLE 7

Two pieces of an amorphous alloy having a composition in weight percent of 60 tungsten - 33 cobalt - 5 iron - 2 boron were bonded together using an interlayer having a composition in weight percent of 45 aluminum - 55 germanium. The aluminum - germanium interlayer material was furnished in the form of a foil having a thickness of 0.001 inches. One piece of the amorphous alloy was placed into a hot press, and a portion of foil was placed over the piece. The second amorphous piece was then placed over the foil. The assembly was hot pressed in one atmosphere argon gas at a ram pressure of 5500 psi and a temperature of 565° C. for 20 minutes followed by a heat treatment in argon at 400° C. for 75 minutes without applied pressure. The resulting bonded assembly was sectioned and examined microscopically. A bond was formed between the pieces. The crystalline interlayer was still present, indicating that the bonding had not been carried to completion. The pieces bonded remained substantially amorphous.

Examples 1, 3, 5, and 7 illustrate that amorphous pieces may be bonded together using an interlayer phase, in accordance with the processing techniques described hereinabove. Examples 2, 4, and 6 illustrate that the respective bonding operations may be carried further to partially or completely eliminate by interdiffusion the separate crystalline phase first present at the interface. When the process is carried to completion, the final structure is completely metallic, entirely amorphous throughout, and fully bonded at the interface.

The examples also illustrate the effect of continued elevated temperature exposure during use of the bonded pieces. When two bonded pieces are exposed to elevated temperature (but below the crystallization temperature) during use, interdiffusion continues. Such elevated temperature exposure and continued interdiffusion of pieces bonded by the process of the present invention does not result in degradation or loss of the bond between the pieces. Instead, the bond remains and composition gradients are reduced, thereby improving the overall quality of the bond. By contrast, continued elevated temperature exposure of parts bonded by conventional techniques often leads to degradation of the bonded quality.

The present invention has the further practical advantages of being readily controlled and of using conventional hot pressing equipment. One prior bonding technique uses explosive charges to force pieces together rapidly, while such a technique accomplishes bonding, it is difficult to control accurately, particularly for oddly shaped pieces, and requires special apparatus.

As will now be appreciated, through the use of this invention an amorphous piece may be bonded to another amorphous or non-amorphous piece by a readily controllable process accomplished at a temperature well below the crystallization temperature of the amorphous piece. When the process of the invention is utilized to join two amorphous materials and the process is carried to completion, the final bonded structure is completely metallic, entirely amorphous and fully bonded at the interface. As applied to the bonding of an amorphous piece to a non-amorphous piece, the process of the present invention produces a structure which is entirely metallic and completely bonded at the interface between the pieces The process of the present invention is also applicable to the building of large structures from a plurality of smaller pieces, some or all of which are amorphous, and also allows the production of sintered amorphous parts from amorphous powders.

Although a particular embodiment of the invention has been described in detail for purposes of illustration, various modifications may be made without departing from the spirit and scope of the invention. Accordingly, the invention is not to be limited except as by the appended claims.

What is claimed is:

1. A process for bonding together a first solid piece and a second solid piece to form a bonded piece, the first piece being an amorphous metal, comprising the steps of:

placing an interlayer material between the two solid pieces, the interlayer material having a solidus temperature less than the crystallization temperature of the first piece and a composition which is diffusionally compatible with the first piece, and wherein the interlayer material is an alloy of aluminum and at least one other element, the other element being selected from the group consisting of silicon, germanium, silver and gold; and hot pressing the two pieces with the interlayer material therebetween at a temperature greater than the solidus temperature of the interlayer material and less than the crystallization temperature of the first piece whereby the interlayer material interdiffuses with the amorphous metal without inducing crystallization of the interdiffused portion of the amorphous metal.

2. The process of claim 1, wherein the interlayer material phase is a powder.

3. The process of claim 1, wherein the second solid piece is an amorphous material and the interlayer material has a solidus temperature less than the crystallization temperature of the second piece the interlayer material having a composition which is diffusionally compatible with the second piece, and further wherein said step of hot pressing is performed at a temperature greater than the solidus temperature of the interlayer material but less than the crystallization temperature of the first piece and less than the crystallization temperature of the second piece.

4. The process of claim 1, wherein said first piece is a powder particle, and said interlayer material is provided as a coating on the particle.

5. The process of claim 1, wherein said first piece is a powder particle, and said interlayer material is provided as a particle.

6. The process of claim 1, wherein the interlayer material includes at least one fluxing element.

7. The process of claim 6, wherein the fluxing element is selected from the group consisting of phosphorus and boron.

8. The process of claim 1, wherein said step of hot pressing is accomplished in a reducing gas.

9. The process of claim 1, wherein said step of hot pressing is accomplished in an inert atmosphere.

10. The process of claim 1, wherein a solid reducing agent is placed between the pieces to reduce any oxides present.

11. The process of claim 1, including the further step of:

bonding a third solid piece to the bonded piece produced in said step of hot pressing.

* * * * *